United States Patent
Lindqvist et al.

(10) Patent No.: US 9,606,256 B2
(45) Date of Patent: Mar. 28, 2017

(54) METHOD AND SYSTEM OF DETERMINING PARAMETERS ASSOCIATED WITH A HYDROCARBON BEARING FORMATION BENEATH A SEA BED

(75) Inventors: U. Peter Lindqvist, Segeltorp (SE); L. Erik Magnus Bjornemo, Knivsta (SE)

(73) Assignee: PGS Geophysical AS, Oslo (NO)

( * ) Notice: Subject to any disclaimer, the term of this patent is extended or adjusted under 35 U.S.C. 154(b) by 1145 days.

(21) Appl. No.: 13/313,150

(22) Filed: Dec. 7, 2011

(65) Prior Publication Data

US 2013/0151155 A1   Jun. 13, 2013

(51) Int. Cl.
*G01V 1/40* (2006.01)
*G01V 3/08* (2006.01)

(52) U.S. Cl.
CPC ........ *G01V 3/083* (2013.01); *G01V 2003/086* (2013.01)

(58) Field of Classification Search
CPC . G01V 11/00; G01V 3/28; G01V 1/28; G01V 1/364; G01V 3/08
USPC .................................. 702/5, 6, 7, 11, 16, 17
See application file for complete search history.

(56) References Cited

U.S. PATENT DOCUMENTS

| | | | |
|---|---|---|---|
| 4,617,518 A | 10/1986 | Srnka | |
| 7,126,338 B2* | 10/2006 | MacGregor et al. | 324/334 |
| 7,548,487 B2* | 6/2009 | Barnes | 367/38 |
| 7,646,671 B2 | 1/2010 | Pan et al. | |
| 7,672,195 B2 | 3/2010 | Barnes | |
| 7,834,632 B2 | 11/2010 | Tenghamn et al. | |
| 2007/0280047 A1 | 12/2007 | MacGregor et al. | |
| 2009/0262601 A1 | 10/2009 | Hillesund et al. | |
| 2009/0306900 A1 | 12/2009 | Jing | |
| 2010/0302900 A1 | 12/2010 | Tenghamn | |

* cited by examiner

*Primary Examiner* — Elias Desta

(57) ABSTRACT

Determining parameters associated with a hydrocarbon bearing formation beneath a sea bed. At least some of the illustrative embodiments are methods including: obtaining data gathered regarding a plurality of distinct readings by sensors, the readings responsive to a source of electrical energy towed in water above the hydrocarbon bearing formation, the sensors sense an electrical parameter associated with the source; combining a first datum associated with a first path of travel of the source with a second datum associated with a second path of travel of the source, the second path of travel distinct from the first path of travel, and the combining creates a first combined datum; and determining the parameter associated with the hydrocarbon bearing formation by evaluating the first combined datum.

32 Claims, 6 Drawing Sheets

METHOD AND SYSTEM OF DETERMINING PARAMETERS ASSOCIATED WITH A HYDROCARBON BEARING FORMATION BENEATH A SEA BED

BACKGROUND

Marine survey systems are used to acquire data (e.g., seismic data, electromagnetic data, etc.) regarding Earth formations below a body of water such as a lake or ocean. Many marine survey systems use one or more sensor streamers towed behind a vessel. Some sensor streamers detect one or more parameters associated with an electromagnetic source.

However, bodies of water, particularly conductive sea water, make the signal-to-noise ratio of detected electromagnetic signals very low. Stated otherwise, the combination of low signal strength at the sensors, along with other noise associated with electromagnetic surveys, makes discerning information from detected signals difficult.

BRIEF DESCRIPTION OF THE DRAWINGS

For a detailed description of exemplary embodiments, reference will now be made to the accompanying drawings in which.

NOTATION AND NOMENCLATURE

Figure 1:
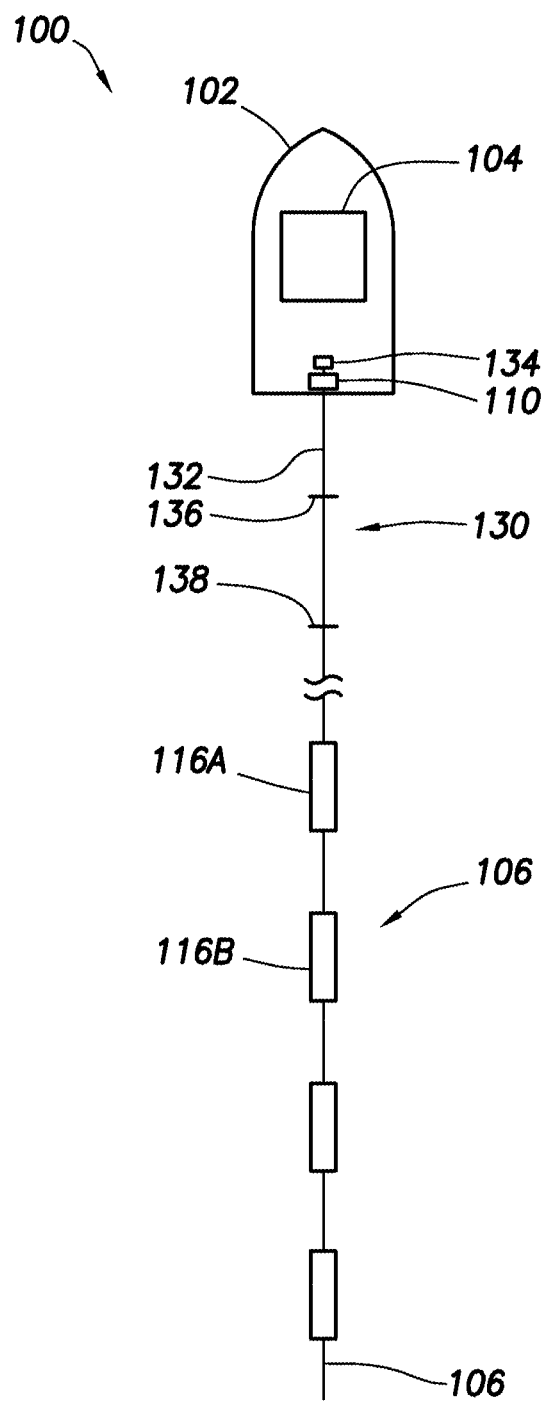
FIG. 1 shows an overhead view of a marine survey system in accordance with at least some embodiments.

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Cable" shall mean a flexible, load carrying member that also comprises electrical conductors and/or optical conductors for carrying electrical power and/or signals between components.

"Rope" shall mean a flexible, axial load carrying member that does not include electrical and/or optical conductors. Such a rope may be made from fiber, steel, other high strength material, chain, or combinations of such materials.

"Line" shall mean either a rope or a cable.

"Sea bed" shall mean the interface of a body of water with underlying sediment. Salinity of the water of the body of water shall not obviate the status of such an interface as a "sea bed."

"Datum" shall mean a set of data collected during a period of time of an activation of a source during an electric/electromagnetic survey. Thus, datum shall not necessarily mean a single value, and the plural of datum shall be "datums".

"Path of travel" with respect to a source or sensors shall mean an imaginary line representing the path traversed by the towing vessel relative to a sea bed. A change of heading of more than 22.5 degrees of compass direction shall be considered a new path of travel. Moreover, identical paths traversed at different times shall be considered different paths of travel.

Reference to geographic area being "distinct" shall mean that one geographic area encompasses at least a portion that is not encompassed by a second geographic area, but shall not require that the geographic areas encompassed are mutually exclusive.

DETAILED DESCRIPTION

The following discussion is directed to various embodiments of the invention. Although one or more of these embodiments may be preferred, the embodiments disclosed should not be interpreted, or otherwise used, as limiting the scope of the disclosure or the claims. In addition, one skilled in the art will understand that the following description has broad application, and the discussion of any embodiment is meant only to be exemplary of that embodiment, and not intended to intimate that the scope of the disclosure or the claims is limited to that embodiment.

Various embodiments are directed to marine electromagnetic surveys, and more particularly to methods of processing sensor data to improve the ability to sense parameters associated with hydrocarbon bearing formations that reside beneath the sea bed.

FIG. 1 shows an overhead view of a marine survey system 100 in accordance with at least some embodiments. In particular, FIG. 1 shows a survey vessel 102 having onboard equipment 104, such as navigation, energy source control, and data recording equipment. Survey vessel 102 is configured to tow at least one sensor streamer 106 through the water. In order to control and/or change the distance behind the tow vessel 102 at which the sensor streamer 106 is towed, and also to retrieve the sensor streamer 106 after use, the sensor streamer couples to a winch 110. The sensor streamer 106 may couple to the onboard equipment by electrical and/or optical connections between the appropriate components in the recording system 104 and the sensors (e.g., 116A, 116B) in the streamers 106. Sensor streamer 106 may be of any length typical for sensor streamers in marine electromagnetic surveys. In some cases, the sensor streamer 106 may have a length of about 8 kilometers (km) as measured starting at the survey vessel 102, but the first sensor 116 may be positioned at least about 2 km from the tow vessel 102.

In some embodiments, each sensor 116 is an electric field sensor. In a particular embodiment, each sensor 116 is a one-dimensional electrical field sensor configured to be most sensitive to electric fields aligned with the direction of travel of the tow vessel 102 (or stated otherwise, most sensitive to electric field polarizations aligned with the longitudinal axis of the streamers 106). In some cases, each sensor is a wire having a length in the range of about 50 meters (m) to about one kilo-meter (km), with each wire operatively coupled to sensors in the onboard equipment 104. In some cases each sensor 116 may be spaced along the streamer 106 as illustrated, but in other cases the lengths of the wire forming each sensor may overlap in the longitudinal direction. While streamer 106 is shown to have four sensors so as not to unduly complicate the figure, in actual use the streamer 106 may have as many as 50 sensors 116. Moreover, different types of electric field sensors (e.g., three-dimensional electric field sensors) may be used in place of, or in addition to, the one-dimensional electric field sensors 116. In yet still other cases, the sensors 116 may be magnetic field sensors, or sensors that sense the combination of electric and magnetic fields—electromagnetic field sensors.

In some embodiments, the tow vessel 102 also tows a source 130 by way of cable 132. The cable 132 and source 130 may couple to a winch 134 on the tow vessel 102. In at least some embodiments, the source 130 comprises two metallic electrodes 136 and 138 (e.g., metal plates) spaced apart along the cable 132. In some cases, the metallic electrodes 136 and 138 may have a spacing of a few meters to a kilometer or more, and more particularly between 500 meters and one kilometer. The source 130 is activated or "fired" by driving a large direct current (DC) amperage between the plates 136 and 138. In some cases, the amperage driven between the plates 136 and 138 is between a few hundred amps to over 2000 amps, and more particularly between 1000 and 2000 amps. In a particular embodiment, during activation the direction of the DC current flow may be reversed periodically (e.g., at a frequency of about 0.1 Hertz (Hz) to about 2 Hz). Thus, source activation may also be considered to be periods of time when a low frequency alternating current (AC) signal is applied to the metallic electrodes 136 and 138. In some cases, the source is activated for an extended period of time, for example 100 seconds. With movement of the tow vessel taken into account, a source 130 activation of 100 seconds may correspond to 200 to 300 meters of horizontal distance traveled. During periods of time when the source 130 is activated and shortly thereafter, the recording equipment records data associated with each sensor 116.

Figure 2:
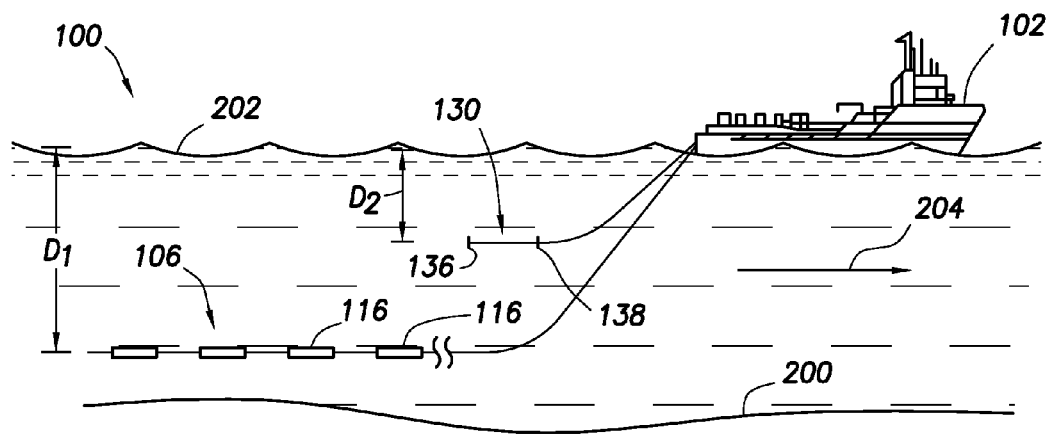
FIG. 2 shows a side elevation view of a marine survey in accordance with at least some embodiments.

FIG. 2 shows a side view of the system 100 in order to convey further concepts. In particular, FIG. 2 shows the tow vessel 102 towing sensor streamer 106 along with the source 130. In some case, the sensor streamer 106 is towed at a depth $D_1$ of about 100 meters but other depths are possible based on the depth below the sea bed 200 to be surveyed. The source 130 is illustrated as towed at a particular depth D2 below the surface 202 of the water but more shallow than the sensor streamer 106; however, the source 130 may be towed at any suitable location, such as on the surface of the water or below (i.e., deeper than) the sensor streamers 106. In a particular embodiment, and as illustrated, the source 130 precedes the sensors 116 along the path of travel 204, but in other the cases the source 130 may reside directly above the sensors 116 or towed behind the sensors 116 along the path of travel 204. The vertical distance between the source 130 and the sensor streamer 116 (i.e., the difference between D2 and D1) may control to some extent the depth of penetration of a survey. That is, having the source 130 and the sensor streamer closer to the same depth may result in more shallow depth of penetration of the survey, and oppositely the greater the difference in depth the deeper penetration of the survey.

When the source 130 is activated the electrical current flowing between the metallic electrodes 136 and 138 creates an electric bipole aligned with the direction of travel of the tow vessel. Other types of sources, as well as other orientations of the bipole created by the source, may be used. Various properties of the bipole measurable at the locations of the sensors 116 may be affected by hydrocarbon bearing formations below the sea bed 200. A theory of how such hydrocarbon bearing formations affects the properties of the bipole measured by the sensors 116 is discussed more below, after a discussion of survey paths.

Figure 3:
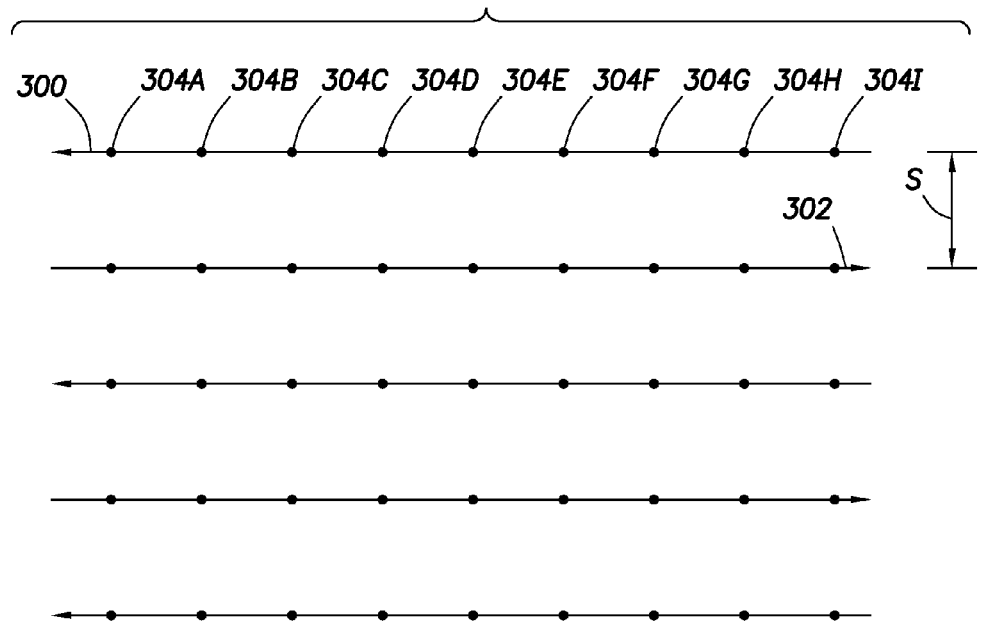
FIG. 3 shows an overhead view of multiple "passes" of a marine survey in accordance with at least some embodiments.

FIG. 3 shows an overhead view of an illustrative paths of travel of the tow vessel 102 (the vessel 102 not shown in FIG. 3) during a marine survey. In particular, in some embodiments the tow vessel 102 makes a series of passes over a particular area of interest. Though any pattern may suffice, as illustrated the tow vessel may travel in a first cardinal direction, as indicated by arrow 300, and then turn and travel in the opposite cardinal direction, as indicated by arrow 302, with a separation S between each pass. During each "pass", the source 130 may be activated multiple times. In some cases, the length of each pass may be many tens of kilometers. Moreover, the separation S between the passes may vary depending on the type and depth of underground formation of interest (e.g., couple of hundred meters to several kilometers).

During time periods when the source is activated and shortly thereafter, information may be gathered by the sensors 116 of the streamers. Each activation and contemporaneous gathering of information is illustrated by dots along each path of travel. For example, along path of travel 300, dots 304A-304I each represent a source activation and information gathering period, which because of movement of the source vessel may be equivalently thought of as a plurality of distinct areas or locations. The source 130 may be activated for an extended period of time (e.g., about 100 seconds) and cover an extended distance, and thus the dots 304 merely indicate each location in a general sense, or perhaps the center of each extended location. In yet still other cases, the source 130 may be activated continuously and the sensors 116 read for distinct periods of time. Regardless, in accordance with at least some embodiments each information gathering period may result in many thousands of readings of the sensors (e.g., on the order of about 14,000 readings), and such a set of readings is referred to herein as a datum.

Figure 4:
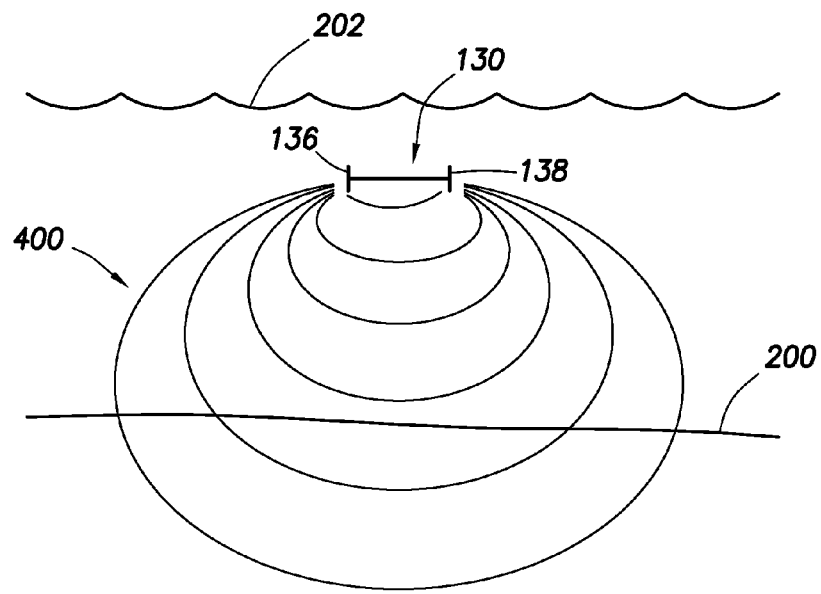
FIG. 4 shows a side elevation, partial cross-sectional view of a source in a body of water in accordance with at least some embodiments.

The specification now turns to an electric field-based theory of how an electromagnetic survey may operate; however, merely describing a competing system based on another theory (e.g., an electromagnetic wave propagation theory) shall not obviate whether such a competing system falls within the scope of the appended claims. In particular, FIG. 4 shows a source 130 in operation and disposed between the surface 202 of the water and the sea bed 200. The electrical current flow between the metallic electrodes 136 and 138 creates an electric bipole and thus an electric current density. The electric current density is illustrated in FIG. 4 by a series of lines 400. The lines are not visible lines, but instead represent lines of constant electric current density relative to the source 130. In actuality, the current density created by the source 130 may be somewhat elliptical surfaces of constant current density, and thus FIG. 4 may be considered a cross-sectional view from an electric current density perspective. FIG. 4 shows six such lines representing electric current density, but any number of such lines may be used. When the source 130 is above a particular location where no hydrocarbon bearing formation is present (and ignoring the affects of the generally lower conductivity of the sediment that forms the sea bed), the current density lines tend to show a relatively uniform distribution extending below the source 130.

Figure 5:
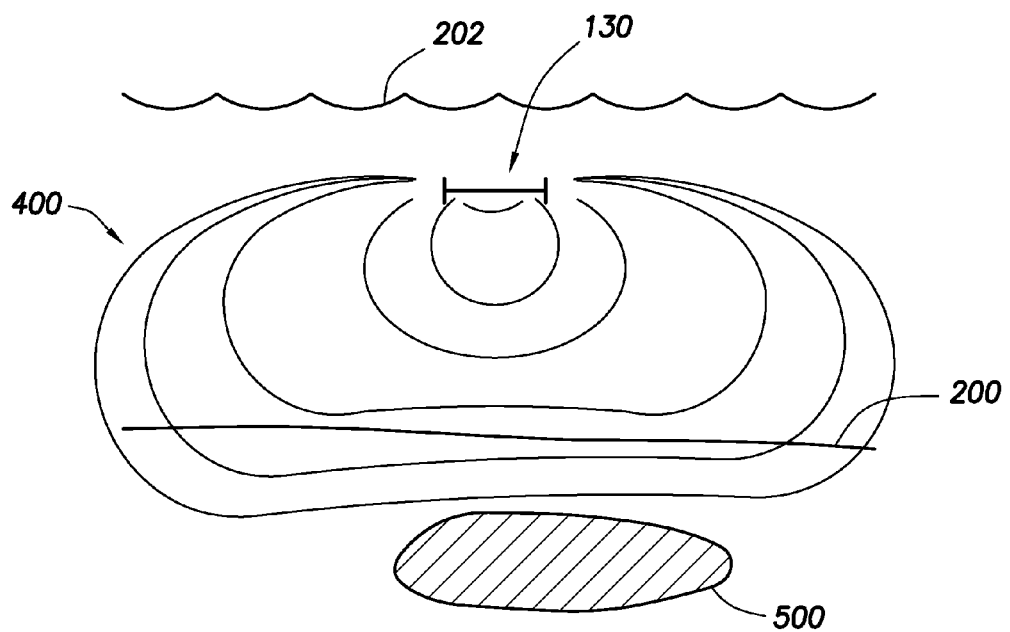
FIG. 5 shows a side elevation, partial cross-sectional view of a source in a body of water, including a target formation, in accordance with at least some embodiments.

FIG. 5 shows a situation similar to FIG. 4 with the source 130 in operation and disposed between the surface 202 of the water and the sea bed 200, but in the case of FIG. 5 the source is positioned over a hydrocarbon bearing formation 500. Hydrocarbons are significantly less conductive that water, particularly salt water, and for purposes of explaining operation of an illustrative system may be considered nonconductive. Though the same current density at the source may be created as between FIGS. 4 and 5, because of the non-conductive properties of the hydrocarbons the current will tend to "bunch" in the presence of the non-conductive medium (i.e., the gradient of the electric current density will be higher). Thus, the presence of the hydrocarbon bearing formation 500 may tend to increase the electric current density measurable by sensors in sensor streamer in operational relationship to the source 130.

Again, the description above is merely one operational theory, and the applicants do not wish to be tied to any particular theory of operation. One may proffer an equally valid operational theory based on electromagnetic wave propagation from the source.

For non-conductive formations very close to the sea bed 202, the change in electric field strength may be significant. Stated otherwise, for a shallow non-conductive formation, increases in electric field caused by the non-conductive formation may create a large signal, and thus a large signal-to-noise ratio. However, for hydrocarbon bearing formations that are further below the sea bed, changes in measured electric field strength (compared to locations where no hydrocarbon is present) may be very small and difficult to detect. Stated otherwise, a body of water may be very noisy electrically, and thus the signal-to-noise ratio even in the presence of a hydrocarbon bearing formation may be such that the noise tends to mask the signal indicative of the presence of the hydrocarbon bearing formation.

In accordance with the various embodiments, the difficulties associated with signal-to-noise ratio may be addressed, at least in part, by combining datums from two or more source activations (sometimes referred to as "shots") to create a combined datum. Based on the theory that the electrical noise has a random distribution (i.e., is uncorrelated), when combining datums from two or more shots, particular shots from different paths of travel, the noise may fully or partially cancel, leaving a greater signal-to-noise ratio. In some cases the signal-to-noise ratio may increase such that parameters associated with the hydrocarbon bearing formation 500 may be determined directly from the combined datum, and in other cases a determination of a parameter of the hydrocarbon bearing formation 500 may be determined by evaluating the combined datum against other data.

Figure 6:
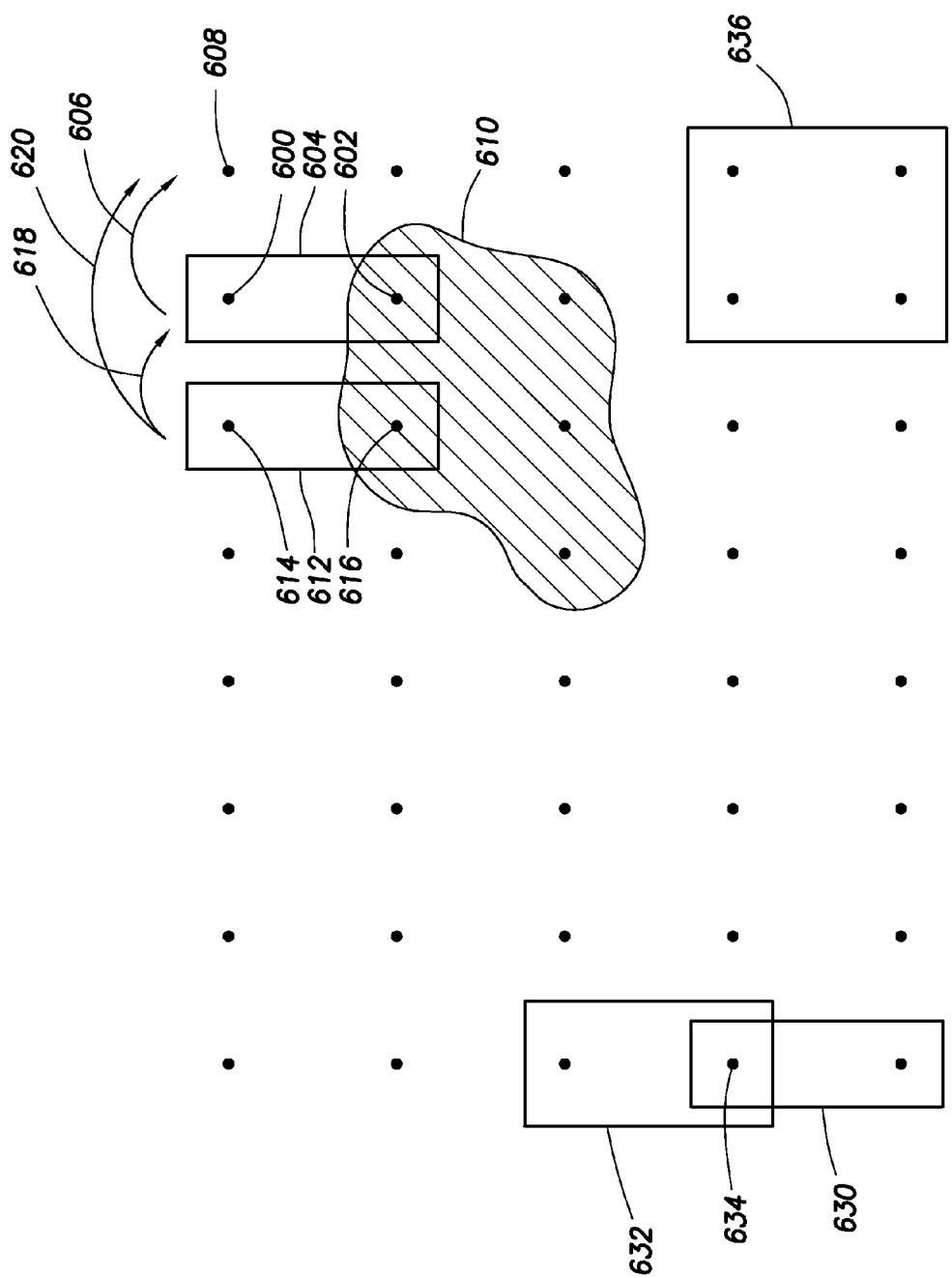
FIG. 6 shows an overhead view of the horizontal extent of a marine survey in accordance with at least some embodiments.

FIG. 6 shows an overhead view of an array of source activations and data gathering, each shown by a dot. In particular, each horizontal row of dots represents datums gathered during a particular path of travel, but the imaginary lines representing each path of travel have been omitted so as not to unduly complicate the figure. In accordance with at least some embodiments, the datums associated with different paths of travel are combined to create a combined datum. In FIG. 6, datum 600 may be combined with datum 602 to create a combined datum 604 (illustrated by rectangular box). The combining may take many forms, discussed in more detail below, but illustratively the combining will be described as averaging such that the magnitude of the combined datum 604 will be on the same order of magnitude as the original datums. In some cases, the combined datum 604 will alone indicate the parameter associated with the hydrocarbon bearing formation (e.g., presence, depth beneath the sea bed, impulse response, frequency response, resistivity, thickness, transverse resistivity, and resistivity contrast). That is, for example, the certainty associated with the magnitude of the combined datum may be sufficient to determine the presence and/or other information regarding a hydrocarbon bearing formation beneath the sea floor in the location of the combined datum 604. It is noted that the potential increase in signal-to-noise ratio that may result from combining datum 600 and 602 to create combined datum 604 may also result in loss of horizontal resolution.

In other cases, a determination as to the parameter associated with the hydrocarbon bearing formation may involve evaluating the combined datum 604 against another datum. In some embodiments, the evaluation against another datum may be a comparison with an uncombined datum, such as uncombined datum 608, as illustrated in FIG. 6 by arrow 606. That is, for example, a parameter of combined datum 604 may be compared to uncombined datum 608, and a statistically significant difference may be indicative of parameters associated with a hydrocarbon bearing formation. For example, if a hydrocarbon bearing formation 610 resides below the sea bed, the parameter of the combined datum 604 may be greater than the parameter of the uncombined datum 608.

In yet still other cases, a combined datum may be evaluated with respect to another combined datum. In FIG. 6, combined datum 612 (illustratively based on datum 614 and 616) may be evaluated against combined datum 604, as illustrated by arrow 618. In addition to or in place of the evaluation of combined datum 612 with combined datum 604, the combined datum 612 may also be evaluation against non-abutting locations, such as evaluating with respect to uncombined datum 608 (illustrated by arrow 620). In other cases, the combined datum against which an evaluation is made may be a field-wide datum, representing a parameter across the entire survey, or a parameter of the datum in a location at which it is known there are no underlying hydrocarbon bearing formations.

The combinations of datums discussed to this point have been based on non-overlapping locations. For example, combined datum 604 comprises locations associated with datum 600 and datum 602, whereas combined datum 612 comprises mutually exclusive locations associated with datum 614 and datum 616. However, in other embodiments the data associated with locations used to create a combined datum may overlap with locations used to create another combined datum. Still referring to FIG. 6, combined datum 630 may be created from data associated with particular locations, and combined datum 632 may be created from data associated with other locations, where there is some overlap (as illustrated, datum 634) as between the datums used to create each combined datum. The discussion with respect to the various possible datums against which evaluation may take place is equally applicable to the combined datum 630 and combined datum 632.

So as not to unduly complicate the discussion, each combined datum discussed to this point has been based on data for only two underlying locations associated with distinct paths of travel; however, a combined datum may be created based on the datums associated with two or more locations. Still referring to FIG. 6, combined datum 636 is illustratively shown to be created from the data associated with four locations spanning two different paths of travel. In some cases, a field-wide datum may be created using most if not all the datums from the field and thus spanning multiple paths of travel. Further still, the paths of travel need not be from the same survey process. For example, datums from a first overall survey having a shallow depth of penetration may be combined with datums from a survey earlier or later in time (e.g., months or years) having deeper depths of penetration.

While creating a combined datum improves signal-to-noise ratio, some spatial resolution may be lost. However, it is currently believed that a combined datum created from individual datums that all reside directly over a hydrocarbon bearing formation may provide the strongest signal of the presence of the hydrocarbon bearing formation, but also delineate the spatial extent of the hydrocarbon bearing formation, and thus the loss of spatial resolution is not necessarily present in every case.

Combining data associated with particular locations may take many forms, such as averaging, non-linear combinations, and moreover may involve one or more optimization steps used to select datums to combine. With respect to averaging, while in some embodiments each datum weighs equally in the averaging, in other embodiments various weighting values may be applied as part of the combining. More particularly then, in at least some embodiments combining of data to create a combined datum may be based on the following formula:

$$CD = \frac{1}{n}\sum_n (wv_n) \times BD_n \quad (1)$$

where CD is the combined datum, n is an index value being the number of datums to be combined, wv is the weighting value for each datum, and BD is a base datum (e.g., an uncombined datum). In some cases, the weighting value wv for datum BD has a value of one, but in other cases the weighting values may be different for some or all the base datums. In yet still other cases, non-linear combinations may be implemented by way of non-linear weighting values (where non-linear connotes both the non-straight line relationships, as well as discontinuous functions).

Selection of a weighting value wv may be based on an array of information. For example, in some cases a datum may be weighted more or less heavily (i.e., the weighting values greater than one or less than one, respectively) based on a parameter of the sediment beneath the sea bed. For example, less conductive sediment may indicate a weighting value less than one, whereas loose sediment infused with highly conductive sea water may indicate a weighting value greater than one. As another example, if by virtue of previous surveys (e.g., previous seismic surveys) it is known that a subsurface object resides at a particular location, the weighting value may be adjusted accordingly for the locations that reside above such a location. As yet another example, the presence of a geological fault lying crossing particular locations may indicate a change in weighting values used.

Further still, the weighting values wv may useful in combining data from surveys performed at different times. For example, a first survey performed in a first year creates first set of datums, and a second survey performed in a second year creates a second set of datums. However, differences between the surveys (e.g., source depth, water salinity) may be compensated for by use of the weighting values.

Understanding now that a combined datum may span different source activations along different paths of travel in the same survey, and indeed may span different surveys, the specification now turns to example operations. For example, the processing may start out with a large "super shot" comprising combining data associated with source activations over a large area. Such a "super shot" may help establish the presence of large, deeply located targets. If the combined data associated with the "super shot" indicates a favorable result, the next step may be creating smaller "shots" to get better spatial resolution or to adapt to targets that are more shallow. Stated otherwise, initial processing may be based on a combined datum spanning a large area, and subsequent combining may be iteratively adapted depending on the results.

For uncorrelated noise, each doubling of the amount of data combined into a combined datum may result in a 3 deciBell (dB) better signal-to-noise ratio, and for large deeply located targets the improvement of using several hundred "shots" can be up to 30 dB (compared to a single, uncombined datum). Thus, by adjusting the amount of data used to create a combined datum, possibly in several steps, the tradeoffs between depth-resolution (larger area of the combined datum), spatial-resolution (smaller area of the combined datum), and noise trade-offs can be ascertained and an improved "shot" length can be selected for the particular property or feature of interest.

As mentioned above, the parameters associated with the hydrocarbon bearing formation may be many, and each parameter may have a different amount of data used to create a combined datum. For example, an example list of parameters of interest may be: presence or absence of a hydrocarbon bearing formation; depth of a hydrocarbon bearing formation; horizontal extent of a hydrocarbon bearing formation; conductivity of a hydrocarbon bearing formation.

Figure 7:
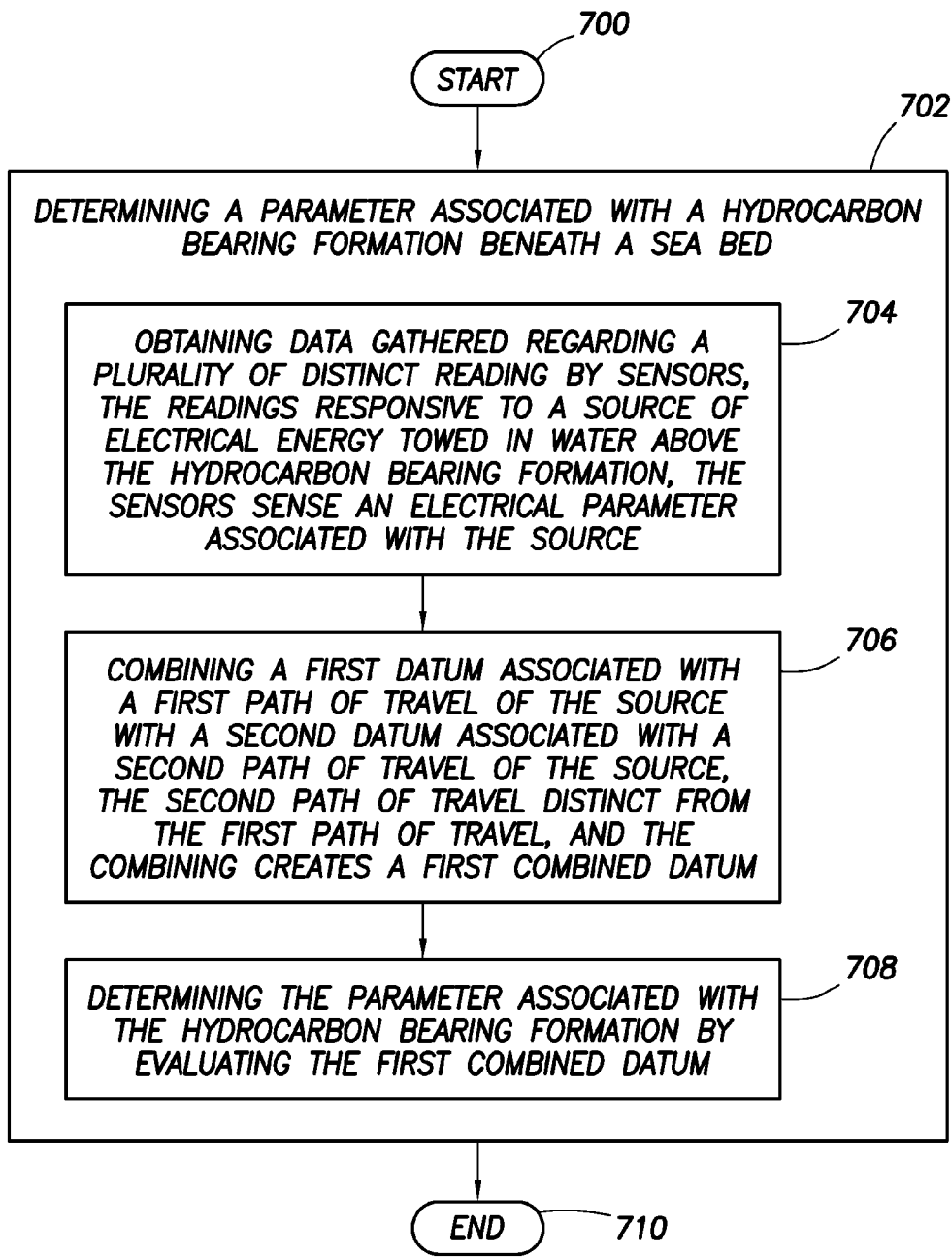
FIG. 7 shows a method in accordance with at least some embodiments.

FIG. 7 shows a method in accordance with at least some embodiments. In particular, the method starts (block 700) and comprises determining a parameter associated with a hydrocarbon bearing formation beneath a sea bed (block 702). The determining may comprise: obtaining data gathered regarding a plurality of distinct readings by sensors, the readings responsive to a source of electrical energy towed in water above the hydrocarbon bearing formation, the sensors sense an electrical parameter associated with the source (block 704); combining a first datum associated with a first path of travel of the source with a second datum associated with a second path of travel of the source, the second path of travel distinct from the first path of travel, and the combining creates a first combined datum (block 706); and determining the parameter associated with the hydrocarbon bearing formation by evaluating the first combined datum (block 708). Thereafter, the method ends (block 710), possibly to be restarted. It is noted that obtaining the data need not require performing an actual marine survey—in some cases the obtaining of data may involve reading previously obtained data, such as from computer storage.

Figure 8:
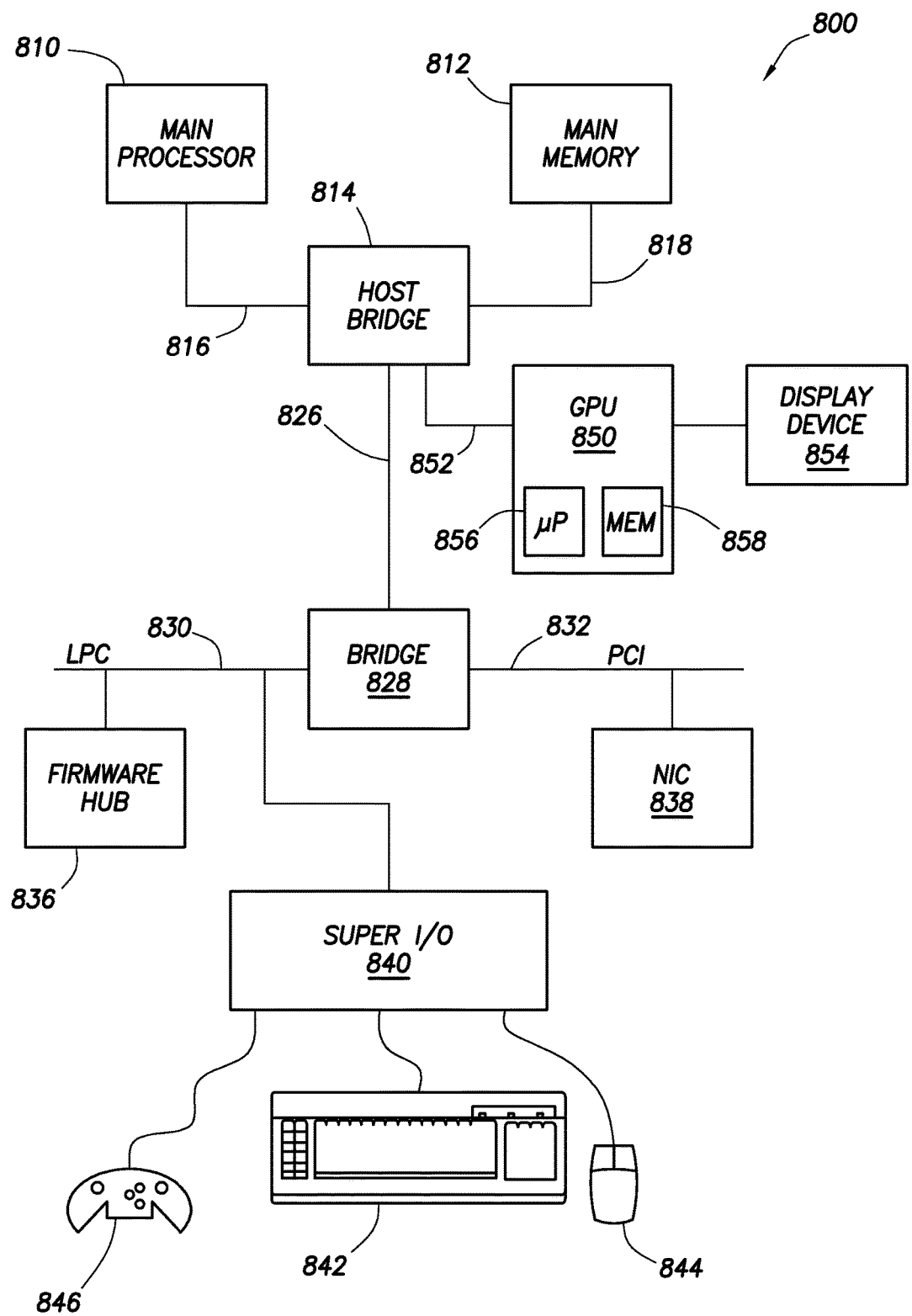
FIG. 8 shows a computer system in accordance with at least some embodiments.

FIG. 8 illustrates a computer system 800 in accordance with at least some embodiments. At least some of the embodiments of combining data, determining parameters associated with hydrocarbon bearing formations, and possibly displaying such information, may be implemented in whole or in part on a computer system such as that shown in FIG. 8, or after-developed computer systems. In particular, computer system 800 comprises a main processor 810 coupled to a main memory array 812, and various other peripheral computer system components, through integrated host bridge 814. The main processor 810 may be a single processor core device, or a processor implementing multiple processor cores. Furthermore, computer system 800 may implement multiple main processors 810. The main processor 810 couples to the host bridge 814 by way of a host bus 816, or the host bridge 814 may be integrated into the main processor 810. Thus, the computer system 800 may implement other bus configurations or bus-bridges in addition to, or in place of, those shown in FIG. 8.

The main memory 812 couples to the host bridge 814 through a memory bus 818. Thus, the host bridge 814 comprises a memory control unit that controls transactions to the main memory 812 by asserting control signals for memory accesses. In other embodiments, the main processor 810 directly implements a memory control unit, and the main memory 812 may couple directly to the main processor 810. The main memory 812 functions as the working memory for the main processor 810 and comprises a memory device or array of memory devices in which programs, instructions and data are stored. The main memory 812 may comprise any suitable type of memory such as dynamic random access memory (DRAM) or any of the various types of DRAM devices such as synchronous DRAM (SDRAM), extended data output DRAM (EDO-DRAM), or Rambus DRAM (RDRAM). The main memory 812 is an example of a non-transitory computer-readable medium storing programs and instructions, and other examples are disk drives and flash memory devices.

The illustrative computer system 800 also comprises a second bridge 828 that bridges the primary expansion bus 826 to various secondary expansion buses, such as a low pin count (LPC) bus 830 and peripheral components interconnect (PCI) bus 832. Various other secondary expansion buses may be supported by the bridge device 828.

Firmware hub 836 couples to the bridge device 828 by way of the LPC bus 830. The firmware hub 836 comprises read-only memory (ROM) which contains software programs executable by the main processor 810. The software programs comprise programs executed during and just after power on self test (POST) procedures as well as memory reference code. The POST procedures and memory reference code perform various functions within the computer system before control of the computer system is turned over to the operating system. The computer system 800 further comprises a network interface card (NIC) 838 illustratively coupled to the PCI bus 832. The NIC 838 acts to couple the computer system 800 to a communication network, such the Internet, or local- or wide-area networks.

Still referring to FIG. 8, computer system 800 may further comprise a super input/output (I/O) controller 840 coupled to the bridge 828 by way of the LPC bus 830. The Super I/O controller 840 controls many computer system functions, for example interfacing with various input and output devices such as a keyboard 842, a pointing device 844 (e.g., mouse), a pointing device in the form of a game controller 846, various serial ports, floppy drives and disk drives. The super I/O controller 840 is often referred to as "super" because of the many I/O functions it performs.

The computer system 800 may further comprise a graphics processing unit (GPU) 850 coupled to the host bridge 814 by way of bus 852, such as a PCI Express (PCI-E) bus or Advanced Graphics Processing (AGP) bus. Other bus systems, including after-developed bus systems, may be equivalently used. Moreover, the graphics processing unit 850 may alternatively couple to the primary expansion bus 826, or one of the secondary expansion buses (e.g., PCI bus 832). The graphics processing unit 850 couples to a display device 854 which may comprise any suitable electronic display device upon which any image or text can be plotted and/or displayed. The graphics processing unit 850 may comprise an onboard processor 856, as well as onboard memory 858. The processor 856 may thus perform graphics processing, as commanded by the main processor 810. Moreover, the memory 858 may be significant, on the order of several hundred megabytes or more. Thus, once commanded by the main processor 810, the graphics processing unit 850 may perform significant calculations regarding graphics to be displayed on the display device, and ultimately display such graphics, without further input or assistance of the main processor 810.

In the specification and claims, certain components may be described in terms of algorithms and/or steps performed by a software application that may be provided on a non-transitory storage medium (i.e., other than a carrier wave or a signal propagating along a conductor). The various embodiments also relate to a system for performing various steps and operations as described herein. This system may be a specially-constructed device such as an electronic device, or it may include one or more general-purpose computers that can follow software instructions to perform the steps described herein. Multiple computers can be networked to perform such functions. Software instructions may be stored in any computer readable storage medium, such as for example, magnetic or optical disks, cards, memory, and the like.

References to "one embodiment", "an embodiment", "a particular embodiment", and "some embodiments" indicate that a particular element or characteristic is included in at least one embodiment of the invention. Although the phrases "in one embodiment", "an embodiment", "a particular embodiment", and "some embodiments" may appear in various places, these do not necessarily refer to the same embodiment.

The above discussion is meant to be illustrative of the principles and various embodiments of the present invention. Numerous variations and modifications will become apparent to those skilled in the art once the above disclosure is fully appreciated. For example, a sensor streamer 116 may comprise multiple individual sections electrically and mechanically coupled end-to-end to form each overall streamer 116. Moreover, while the term "shot" has been used in relation to a period of time of a source activation, a "shot" may also be considered a period of time of gathering data when a source is activated continuously, or period of time of gathering data less than an amount of time the source is activated even if the source is not activated continuously. Moreover, in some cases a survey company may perform a survey of an area at its own behest, with no customer contracting for the services. At some later point in time, a survey customer may "purchase" data from the survey and use the data. Thus, in some cases the commercial product is a data set representing a hydrocarbon bearing formation beneath a sea bed. It is intended that the following claims be interpreted to embrace all such variations and modifications.

What is claimed is:

1. A method comprising:
   towing a sensor streamer along a first path of travel of a source, the sensor streamer comprising a plurality of electric field sensors polarized along the first path of travel, and the first path of travel above a hydrocarbon bearing formation;

sensing by the electric field sensors polarized along the first path of travel, the sensing along the first path of travel creates a first datum;

towing the sensor streamer along a second path of travel of the source, the second path of travel different than the first path of travel, and the electric field sensors of the sensor streamer polarized along the second path of travel, the second path of travel above the hydrocarbon bearing formation;

sensing by the electric field sensors polarized along the second path of travel, the sensing along the second path of travel creates a second datum;

combining the first datum associated with the first path of travel of the source with the second datum associated with the second path of travel of the source, the combining creates a first combined datum, and the first combined datum has a higher signal-to-noise ratio than the first datum or second datum; and determining a parameter associated with the hydrocarbon bearing formation by evaluating the first combined datum.

2. The method of claim 1 wherein combining the first and second datum further comprises averaging the first and second datum.

3. The method of claim 2 wherein, prior to averaging the first and second datum, the method further comprises:
multiplying the first datum by a first weighting value; and
multiplying the second datum by a second weighting value.

4. The method of claim 3 wherein the first weighting value is selected based on at least one selected from the group consisting of: a parameter of the sediment beneath the sea bed; location of a previously known subsurface object; and presence of a fault proximate to the location with which a datum is associated.

5. The method of claim 1:
wherein the first combined datum is created based on a first geographic area;
combining data associated with a second geographic area distinct from the first geographic area, the combining creates a second combined datum; and
wherein evaluating the first combined datum further comprises evaluating the first combined datum with respect to the second combined datum.

6. The method of claim 1 wherein evaluating the first combined datum further comprises evaluating the first combined datum with respect to a second combined datum distinct from the first combined datum.

7. The method of claim 6 wherein the second combined datum is at least one selected from the group consisting of: created based on the first datum but not the second datum; and created using other than the first datum and second datum.

8. The method of claim 1 wherein the parameter associated with the hydrocarbon bearing formation is at least one selected from the group consisting of: presence; depth beneath the sea bed; impulse response; frequency response; resistivity; thickness; transverse resistivity; and resistivity contrast.

9. A computer system comprising:
a processor; and
a memory coupled to the processor;
wherein the memory stores a program that, when executed by the processor, causes the processor to:
read data of an electromagnetic survey of a hydrocarbon bearing formation, the data comprising a first datum that includes measurements recorded from a set of electric field sensors polarized along a first path of travel of a source, and the data comprising a second datum that includes measurements recorded from the set of electric field sensors polarized along a second path of travel of the source different than the first path of travel;

create a first combined datum by combining the first datum associated with a first path of travel of the source with a second datum associated with the second path of travel of the source, and the first combined datum has a higher signal-to-noise ratio than the first datum or second datum; and determine a parameter associated with the hydrocarbon bearing formation based on the first combined datum.

10. The computer system of claim 9 wherein when the processor creates the first combined datum, the program further causes the processor to average the first and second datum.

11. The computer system of claim 10 wherein when the processor averages, the program causes the processor to:
multiply the first datum by a first weighting value; and
multiply the second datum by a second weighting value.

12. The computer system of claim 11 wherein the program further causes the processor to selected the first weighting value, the selection based on at least one selected from the group consisting of: a parameter of the sediment beneath the sea bed; location of a previously known subsurface object; and presence of a fault proximate to the location with which a datum is associated.

13. The computer system of claim 9:
wherein when processor creates the first combined datum, the program causes the processor to create the first combined datum based on a first geographic area, the first geographic area encompassing the first and second datum;
wherein the program further causes the processor to create a second combined datum based on a second geographic area distinct from the first geographic area; and
wherein when the processor determines the parameter associated with the hydrocarbon bearing formation, the program causes the processor to evaluate first combined datum with respect to the second combined datum.

14. The computer system of claim 9 wherein when the processor determines the parameter based on the first combined datum, the program causes the processor to evaluate the first combined datum with respect to a second combined datum distinct from the first combined datum.

15. The computer system of claim 14 wherein the second combined datum is at least one selected from the group consisting of: created based on the first datum but not the second datum; and created using other than the first datum and second datum.

16. A non-transitory computer-readable medium storing a program that, when executed by a processor, causes the processor to:
read data of an electromagnetic survey of a hydrocarbon bearing formation, the data comprising a first datum that includes measurements recorded from a set of electric field sensors polarized along a first path of travel of a source, and the data comprising a second datum that includes measurements recorded from the set of electric field sensors polarized along a second path of travel of the source different than the first path of travel;

create a first combined datum by combining the first datum associated with the first path of travel of the source with the second datum associated with the second path of travel of the source, and the first combined datum has a higher signal-to-noise ratio than the first datum or second datum; and determine a parameter associated with the hydrocarbon bearing formation based on the first combined datum; and display on a display device coupled to the processor an indication of the parameter determined.

17. The non-transitory computer-readable medium of claim 16 wherein when the processor creates the first combined datum, the program further causes the processor to average the first and second datum.

18. The non-transitory computer-readable medium of claim 17 wherein when the processor averages, the program causes the processor to:
multiply the first datum by a first weighting value; and
multiply the second datum by a second weighting value.

19. The non-transitory computer-readable medium of claim 18 wherein the program further causes the processor to selected the first weighting value, the selection based on at least one selected from the group consisting of: a parameter of the sediment beneath the sea bed; location of a previously known subsurface object; and presence of a fault proximate to the location with which a datum is associated.

20. The non-transitory computer-readable medium of claim 16:
wherein when processor creates the first combined datum, the program causes the processor to create the first combined datum based on a first geographic area, the first geographic area encompassing the first and second datum;
wherein the program further causes the processor to create a second combined data based on a second geographic area distinct from the first geographic area; and
wherein when the processor determines the parameter associated with the hydrocarbon bearing formation, the program causes the processor to evaluate first combined datum with respect to the second combined datum.

21. The non-transitory computer-readable medium of claim 16 wherein when the processor determines the parameter based on the first combined datum, the program causes the processor to evaluate the first combined datum with respect to a second combined datum distinct from the first combined datum.

22. The non-transitory computer-readable medium of claim 21 wherein the second combined datum is at least one selected from the group consisting of: created based on the first datum but not the second datum; and created using other than the first datum and second datum.

23. A non-transitory computer-readable medium storing datums regarding a survey of a hydrocarbon bearing formation, the datums created by a method comprising:
towing a sensor streamer along a first path of travel of a source, the sensor streamer comprising a plurality of electric field sensors polarized along the first path of travel, and the first path of travel above a hydrocarbon bearing formation;
sensing by the electric field sensors polarized along the first path of travel, the sensing along the first path of travel creates a first datum;
towing the sensor streamer along a second path of travel of the source, the second path of travel different than the first path of travel, and the electric field sensors of the sensor streamer polarized along the second path of travel, the second path of travel above the hydrocarbon bearing formation;
sensing by the electric field sensors polarized along the second path of travel, the sensing along the second path of travel creates a second datum;
combining a first datum associated with a first path of travel of the source with a second datum associated with a second path of travel of the source, and the combining creates a first combined datum, and the first combined datum has a higher signal-to-noise ratio than the first datum or second datum.

24. The non-transitory computer-readable medium of claim 23 wherein in creating the datums the combining further comprises averaging the first and second datum.

25. The non-transitory computer-readable medium of claim 24 wherein in creating the datums the combing further comprises, prior to averaging the first and second datum:
multiplying the first datum by a first weighting value; and
multiplying the second datum by a second weighting value.

26. The non-transitory computer-readable medium of claim 25 wherein in creating the datums the first weighting value is selected based on at least one selected from the group consisting of: a parameter of the sediment beneath the sea bed; location of a previously known subsurface object; and presence of a fault proximate to the location with which a datum is associated.

27. The non-transitory computer-readable medium of claim 23 wherein in creating the datums the method further comprises:
wherein the first combined datum is created based on a first geographic area; and
combining data associated with a second geographic area distinct from the first geographic area, the combining creates a second combined datum.

28. The non-transitory computer-readable medium of claim 16 wherein when the processor determines, the program causes the processor to determine the parameter being at least one selected from the group consisting of: presence of the hydrocarbon bearing formation; depth beneath the sea bed of the hydrocarbon bearing formation; impulse response of the hydrocarbon bearing formation; frequency response of the hydrocarbon bearing formation; resistivity of the hydrocarbon bearing formation; thickness of the hydrocarbon bearing formation; transverse resistivity of the hydrocarbon bearing formation; and resistivity contrast of the hydrocarbon bearing formation.

29. The method of claim 1 wherein combining the first datum polarized along the first path of travel and the second datum polarized along the second path of travel further comprises combining wherein the first and second paths of travel are parallel.

30. The computer system of claim 9 wherein when the processor creates the first combined datum, the program causes the processor to combine datums wherein the first path of travel is parallel to the second path of travel.

31. The non-transitory computer-readable medium of claim 16 wherein when the processor creates the first combined datum, the program causes the processor to combine datums wherein the first path of travel is parallel to the second path of travel.

32. The non-transitory computer-readable medium of claim 23 wherein combining further comprises combining datums wherein the first path of travel is parallel to the second path of travel.

* * * * *